Nov. 19, 1940.   E. E. FERRIS   2,222,023
FLEXIBLE COUPLING
Filed March 5, 1940

INVENTOR
Ernest E. Ferris
BY
Pennie Davis Marvin & Edmonds
ATTORNEYS

Patented Nov. 19, 1940

2,222,023

UNITED STATES PATENT OFFICE 2,222,023

FLEXIBLE COUPLING

Ernest E. Ferris, Cohoes, N. Y., assignor to Ramsey Chain Company, Inc., Albany, N. Y., a corporation of New York Application March 5, 1940, Serial No. 322,270

3 Claims. (Cl. 64—19)

This invention relates to flexible couplings adapted for use in connecting shafts with their ends in abutting relation. Such couplings avoid the necessity for perfect alignment of the shafts.

Couplings of the type described and consisting of a pair of pinions secured to the shafts and engaged by a flexible chain have been heretofore known. In such couplings, the pinions were provided with parallel faces. In an effort to avoid the shearing action on the pintles of the flexible chain which is incidental to the transfer of energy from the driving to the driven pinion, it has been suggested that the pinions be provided with interlocking lugs carrying extensions of the toothed surfaces of the pinions. The shearing stresses are nevertheless transferred to the pintles in the latter type of coupling, and in use the pintles are frequently broken, thus rendering the device useless for its intended purpose.

It is the object of the present invention to afford an improved form of coupling in which the disadvantages hereinbefore mentioned are avoided and in which it is possible to transmit power from one shaft to another through a device of relatively small dimensions without substantial wear or danger of breakage, the coupling being so designed as to distribute the stresses to the pintles in a uniform manner during the operation of the device.

Other objects and advantages of the invention will be apparent as it is better understood by reference to the following specification and the accompanying drawing, in which Fig. 1 is a side elevation of the coupling;

I have discovered that the stresses in the chain employed in a flexible coupling of the type described may be minimized or eliminated by providing complementary pinions having faces disposed diagonally to the axes of the pinions so that teeth on opposite sides of the coupling when the two pinions are brought into the proper contiguous relation extend to a width almost equal, though slightly less, than the width of the chain which co-operates with the complementary pinions to transfer power from one to the other. By thus forming the pinions, I have discovered that the stresses in the pintles of the chain are directed in such a way as to minimize twisting and shearing effects. The life of the coupling is extended, and it is capable of transmitting more power with elements of a given size than flexible couplings as heretofore constructed.

Figure 1:
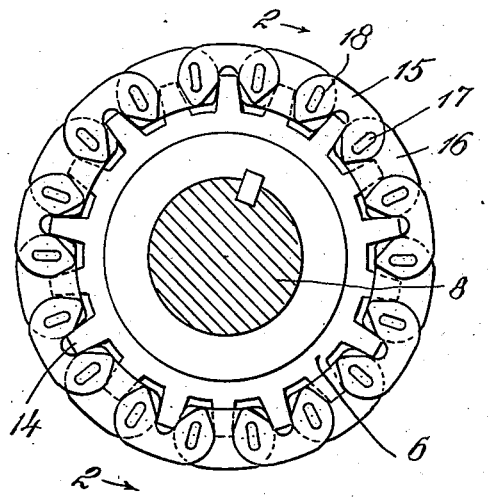
Figure 2:
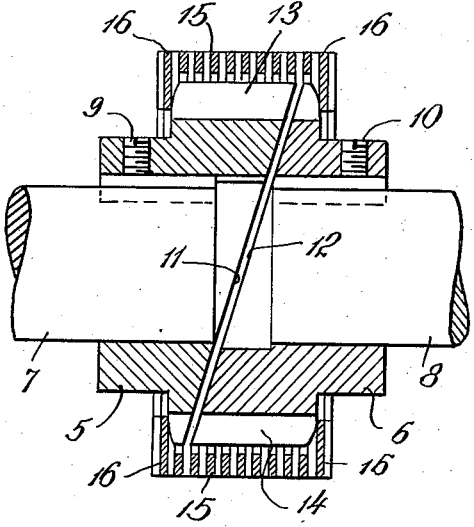
Fig. 2 is a longitudinal section therethrough.
Figure 3:
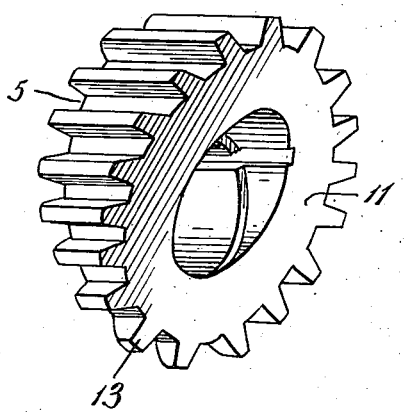
Fig. 3 is a view in perspective of one of the elements of the coupling.
Figure 4:
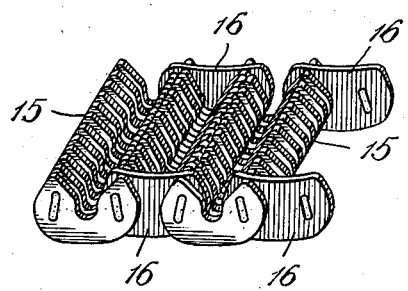
Fig. 4 is a segment of a silent chain adapted for use with the coupling.

Referring to the drawing, 5 and 6 represent two pinions adapted to be secured to shafts 7 and 8 by screws 9 and 10 or by other suitable means. Each of the pinions is formed with a diagonal face indicated at 11 and 12, so that the pinions may be brought together as indicated in Fig. 2 of the drawing. Each of the pinions is provided with a plurality of teeth 13 and 14 of a form adapted to co-operate with a silent chain comprising a plurality of links 15 and 16 connected by pintles 17 and 18. As indicated in Figs. 1 and 2, the end links 16 of the chain may be formed to overlap the ends of the teeth, thereby preventing the chain from slipping from the coupling during operation. The details of the chain form no part of the present invention and are well known in the art. The chain surrounds and closely fits the assembled pinions and is adapted to transmit power from the driving pinion to the driven pinon and thence to the shaft on which the latter is secured.

As will be seen by reference to Fig. 2 of the drawing, the tooth 13 on the pinion 5 at the top of the coupling extends throughout nearly the entire width of the chain, whereas the adjacent portion of the tooth 14 on the coupling 6 engages only a few of the links. On the other side of the coupling, the arrangement is reversed. Midway between the top and bottom of the coupling as shown in the drawing, the length of the teeth on the respective pinions is substantially equal. As the faces of the two pinions are diagonally disposed with reference to their axes, individual links of the chain, along the line of juncture of the teeth of the two pinions, will extend across the ends of the aligned teeth on both pinions, and the shearing and twisting stresses will be equalized uniformly throughout the chain, thus avoiding the destructive effect on the pintles which has been a characteristic of flexible couplings of the type described in forms heretofore known.

The invention, therefore, affords a substantial improvement in flexible couplings, the improvement depending upon the provision of pinions with diagonally disposed faces arranged in contiguous relation and adapted to received a chain.

Various changes may be made in the form, structure and size of the various parts without departing from the invention or sacrificing the advantages thereof.

I claim:

1. A flexible coupling adapted to afford a driving connection between two shafts in approximate alignment, comprising a pair of toothed pinions secured to the respective shafts and having opposite faces diagonally disposed with reference to their axes and a flexible chain connecting the two pinions and engaging the teeth thereon.

2. A flexible coupling adapted to afford a driving connection between two shafts in approximate alignment, comprising a pair of toothed pinions secured to the respective shafts and having opposite faces diagonally disposed with reference to their axes and a flexible chain connecting the two pinions and engaging the teeth thereon, the teeth on the respective pinions at opposite sides of the coupling approaching in length the width of the flexible chain.

3. A flexible coupling adapted to afford a driving connection between two shafts in approximate alignment, comprising a pair of toothed pinions secured to the respective shafts and having opposite faces diagonally disposed with reference to their axes and a flexible chain connecting the two pinions and engaging the teeth thereon, said chain being greater in width than the combined length of the corresponding teeth of the two pinions, and said chain having near each of its sides members adapted to abut the outer ends of the teeth of the two pinions, whereby the chain is held in aligned relation to the toothed pinions.

ERNEST E. FERRIS.